March 13, 1928.
A. KINGSBURY
MEASURING MACHINE
Filed Oct. 14, 1922
1,662,425
2 Sheets-Sheet 2
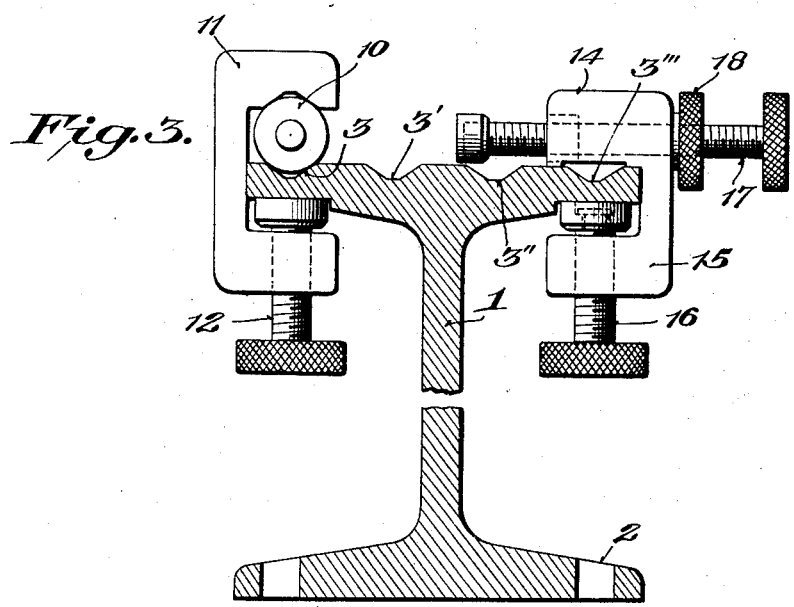
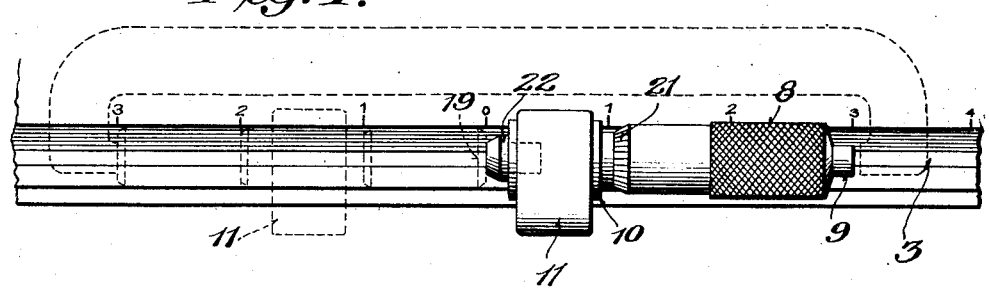
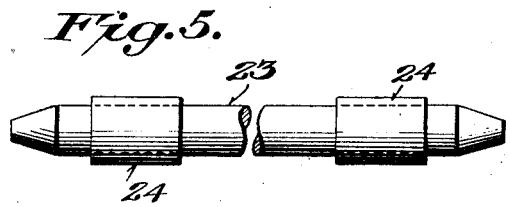

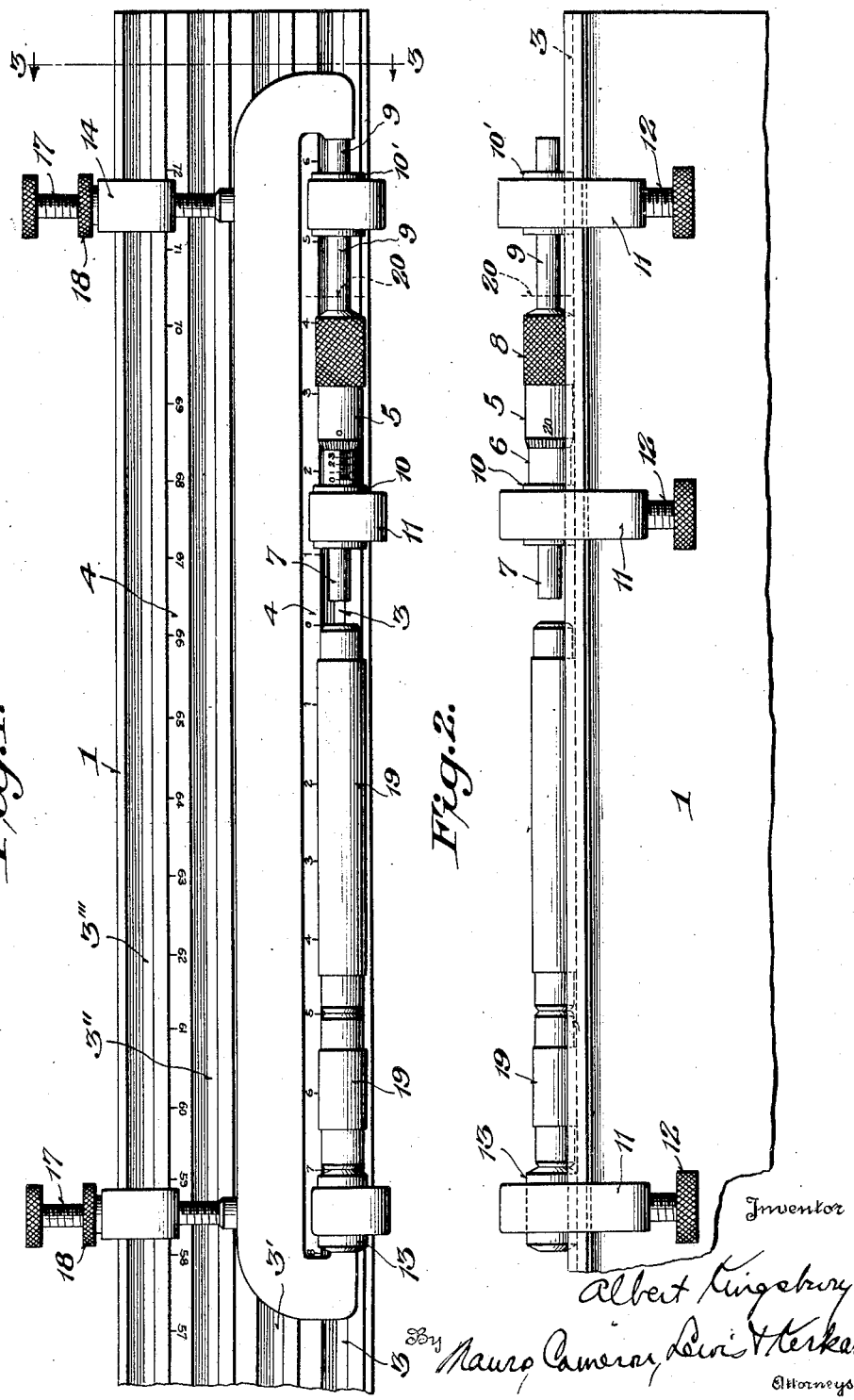

Patented Mar. 13, 1928.

1,662,425

UNITED STATES PATENT OFFICE.

ALBERT KINGSBURY, OF GREENWICH, CONNECTICUT, ASSIGNOR TO KINGSBURY MACHINE WORKS, INC., OF PHILADELPHIA, PENNSYLVANIA, A CORPORATION OF DELAWARE.

MEASURING MACHINE.

Application filed October 14, 1922. Serial No. 594,574.

This invention relates to measuring machines and particularly to that type of measuring machine employed in comparing pin gauges, snap gauges, etc., with standard lengths.

Measuring machines of the types heretofore constructed have either been too large and expensive for the average user or they have been of the light, hand-tool type which is incapable of extreme accuracy or of handling a large variety of work.

Among the objects of this invention are: to provide a simple machine capable of handling a large variety of work with a high degree of accuracy; to provide a machine in which uniformity of temperature between the gauge to be measured and the standard may be easily obtained; to provide a machine the initial cost of which is low and one in which worn parts may be readily and economically renewed. These and other objects will appear as the description proceeds.

The invention is capable of receiving a variety of mechanical expressions, one of which for purposes of illustration, is shown in the accompanying drawings, but it is to be expressly understood that the drawings are for purposes of illustration only and are not to be construed as defining the limits of the invention, reference being had to the appended claims for that purpose.

Referring to the drawings wherein similar reference numerals refer to similar parts throughout the several views, Fig. 1 is a plan view of one embodiment of the inventive idea, showing the parts in position for measuring a snap gauge;

Fig. 2 is a side elevation, a portion of the support or beam being broken away;

Fig. 3 is a section taken on the line 3—3 of Fig. 1;

Fig. 4 is a plan view of a short micrometer which may be employed in place of the longer one illustrated in Fig. 1; and Fig. 5 is a plan view, having a portion broken away, of a pin gauge of small diameter, provided with bushings to facilitate measurement of the pin.

In the form shown, 1 represents a rigid base or support, of any suitable size and material, having in the lower flange thereof openings 2, whereby said base may be secured to a workbench or, in accordance with its size, to the shop floor. The upper face or surface of base 1 is provided with a plurality of longitudinally extending parallel grooves 3, 3′, 3″, etc. On the lands between these grooves are stamped scales 4, reading in inches.

The head stock of the machine comprises a micrometer 5 having the interiorly threaded sleeve 6, and extending through the latter is the usual spindle 7. The knurled barrel 8, to which is secured spindle 7, may be provided with a spindle extension 9 of any suitable length. Sleeve 6 is provided with a collar 10 of such a diameter that when the micrometer is placed in groove 3, the knurled barrel 8 will be clear of the sides of said groove.

In order that micrometer 5 may be quickly moved and securely held at any point along groove 3, there are provided one or more U-shaped clamps 11, having knurled-headed tightening screws 12. One of said clamps is employed to engage collar 10, while a second clamp, together with a centering bushing 10′, may be used to support spindle extension 9.

The tail stock comprises a gauge or short standard length 13, preferably of a diameter equal to that of collar 10, and a clamp 11 for holding gauge 13 in adjusted position.

In order that the work to be measured may be squared so that it occupies the same position at each measurement, one or more gauge stops 14 may be provided. Each of these stops comprises a U-shaped member 15 through the lower arm of which is threaded the tightening screw 16, adapted to engage the lower side of the upper flanged portion of support or beam 1 and securely hold member 15 in adjusted position. Threaded into a horizontally disposed opening in the upper arm of member 15 is the screw 17, provided with lock nut 18, which may be moved transversely across the grooved face of support 1 to any desired position.

Any number of suitable standard lengths 19 may be employed in order that the machine may be used in measuring members of various sizes or dimensions. These lengths are preferably slightly less in diameter than that of collar 10 for a purpose to be hereinafter described.

In case it is desired to compare pin gauges with standard lengths, the operation of my device is as follows: The standard lengths totaling the nearest inch less than the pin gauge length to be measured, for example 7 inches, are laid end to end in groove 3. Micrometer 5 is set at zero against one end of the line of standard lengths and gauge 13 is placed against the other end. Both are then clamped to beam or support 1, in groove 3, by means of the clamps 11. Before tightening the clamp on gauge 13 it should be pressed snugly against the line of standard lengths to take up all slack between them and micrometer 5. Micrometer spindle 7 should then be screwed back and forth to see that the end thereof comes to the zero mark when it is against the standard lengths. Spindle 7 is then screwed away from the standard length or lengths 19 and the latter are rolled over into groove 3', out of the way. The length to be measured, for example, a pin gauge 7.375" long is now placed in groove 3 against gauge 13 and spindle 7 screwed up until it presses against the end of the pin gauge. In this position the micrometer scale will not read zero as was the case when the standard lengths were in groove 3, but instead, the reading will be 0.375 inches. There is thus provided means for checking the lengths of shop gauges and of taking the measurements necessary for the making of new pin gauges.

When setting standard lengths 19 in groove 3 the overall length may be readily checked by means of the scales 4, thus avoiding the likelihood of the machine being set one inch or more too short or too long.

The machine may be used for taking inside measurements, for example the dimension of a snap gauge 14.375" long, as illustrated in Fig. 1. In this instance, spindle extension 9 is employed in a manner similar to that of spindle 7 in the example described above. Since the overall length of spindle 7 and spindle extension 9 in the illustrated embodiment is 6 inches and that of gauge 13 is 1 inch, it is obvious that the standard lengths to be employed in taking this measurement are of the same total length as those employed in the previous example, i. e. 7 inches. Extension 9 may be eliminated if desired and the length thus lost can be supplemented by the use of additional standard lengths 19.

Referring particularly to Fig. 2 it will be noted that the center lines of spindle 7 and gauge 13 lie slightly above the center line of the standard lengths 19. If these center lines coincided, the continued use of the machine would wear away the ends of spindle 7 and gauge 13 at their centers, but by providing collar 10 and gauge 13 with diameters in excess of that of the work to be measured, as well as that of the standard lengths, the work will press against various portions of the ends of the measuring faces so that the wear will be more evenly distributed and therefore much less at any one place.

In order that snap gauges of smaller size may be measured, the spindle extension 9 may be made of shorter length, for example, terminating at the dotted line 20 in Figs. 1 and 2 so that the minimum overall length of the micrometer 5 with its spindles 7 and 9 shall be 4 inches; or the micrometer 21 illustrated in Fig. 4 may be used. Spindle 22 of this micrometer is fixed in collar 10, while barrel 8 is provided with a short spindle extension 9 which has a movement of 1 inch. Micrometer 21 is secured in groove 3 by means of the clamp 11 as before. In using this embodiment of my invention one or more standard lengths 19, which, with the overall length of the micrometer, total the nearest number of inches less than the snap gauge to be measured, may be laid in the groove 3 in engagement with spindle 22 as shown in dotted lines, and secured in position by clamp 11 if desired, and the snap gauge then positioned with its left hand end (as viewed in Fig. 4) in engagement with said standard lengths. The micrometer may then be adjusted to engage the right hand end of the gauge and the fraction of an inch read therefrom. Assuming that the minimum overall length of the micrometer is 3 inches, this embodiment enables measurement of snap gauges of any dimension from 3 inches up.

In case the pin gauge 23 to be measured is of small diameter, bushings 24 may be slipped over the ends thereof as illustrated in Fig. 5. These bushings will lie in groove 3 and bring the ends of pin 23 into the proper position.

Uniformity of temperature between the gauge to be measured and the standard lengths may be easily obtained by leaving these parts in groove 3', on the top of the machine, where their temperatures will equalize in a short time.

While the illustrated embodiment of the inventive idea has been described with considerable particularity, it is to be expressly understood that the invention is not limited thereto as various changes will now readily suggest themselves to those skilled in the art. Reference is therefore to be had to the appended claims in defining the limits of the invention.

What I claim is:

1. A measuring machine comprising, in combination, a supporting member having a groove in the upper face thereof, a micrometer adapted to lie in said groove, and means whereby said micrometer may be secured in said groove, the latter being adapted to receive a member to be measured.

2. A measuring machine comprising, in combination, a supporting member having a groove in the upper face thereof, a micrometer adapted to lie in said groove, means whereby said micrometer may be secured in said groove, and a tail stock adapted to be secured in said groove, said supporting member being adapted to support a member to be measured in said groove in engagement with said micrometer.

3. A measuring machine comprising, in combination, a supporting member having a plurality of longitudinally extending grooves in the upper face thereof, there being a scale stamped on one or more of the lands between said grooves, a micrometer adapted to lie in one of said grooves, and means whereby said micrometer may be secured in said groove.

4. A measuring machine comprising, in combination, a supporting member having a longitudinally extending groove in the upper face thereof and a scale stamped thereon adjacent one edge of said groove and parallel therewith, a micrometer, and means whereby said micrometer may be secured in said groove at any part along the length of the same.

5. A measuring machine comprising, in combination a supporting member having a longitudinally extending groove in the upper face thereof, a cylindrical gauge, means whereby said gauge may be clamped in said groove, a micrometer having a collar equal in diameter to that of said gauge, and means whereby said micrometer may be clamped in said groove.

6. A measuring machine comprising, in combination, a supporting member having a groove therein adapted to receive a device to be measured, a micrometer adapted to lie on said supporting member with its axis parallel thereto, means for securing said micrometer to said supporting member at any point along the length of said member, and a tail stock adapted to be secured to said supporting member in alinement with said micrometer at any desired distance therefrom.

7. A measuring machine comprising, in combination, a supporting member on which the work to be measured is adapted to be laid, a micrometer adapted to lie on said supporting member with its axis parallel thereto, means for securing said micrometer on said supporting member, and a tail stock adapted to be secured to said supporting member in alinement with said micrometer at any desired distance therefrom, said support having a scale stamped thereon for indicating the distance between said mocrometer and said tail stock.

8. A measuring machine comprising, in combination, a supporting member having a groove in its upper face, a micrometer adapted to lie in said groove, means for securing said micrometer in said groove at any point along the length of the same, a cylindrical gauge adapted to lie in said groove in alinement with said micrometer at any desired distance therefrom, and means for securing said gauge in said groove.

9. A measuring machine comprising, in combination, a supporting member having a groove in its upper face, a micrometer adapted to lie in said groove, means for securing said micrometer in said groove at any point along the length of the same, a tail stock adapted to lie in said groove in alinement with said micrometer at any desired distance therefrom, means for securing said tail stock in said groove, and a scale on said supporting member for indicating the distance between said micrometer and said tail stock, said groove being adapted to receive a member to be measured.

10. A measuring machine comprising, in combination, a supporting member having a groove in its upper surface, a micrometer having a spindle at each end thereof and adapted to lie in said groove, and means whereby said micrometer may be secured in said groove at any point along the length of the same.

11. A measuring machine comprising, in combination, a supporting member, a micrometer having a spindle at each end thereof, means for securing said micrometer on said supporting member at any point along the length of the same, a tail stock adapted to be positioned on said supporting member in alinement with said micrometer at any desired distance therefrom, and means for securing said tail stock on said supporting member.

12. A measuring machine comprising, in combination, a supporting member having a groove in the upper face thereof, a micrometer adapted to lie in said groove, means whereby said micrometer may be secured in said groove, a tail stock, means for securing said tail stock in said groove at any desired distance from said micrometer, and one or more gauge stops mounted on said supporting member between said micrometer and tail stock for positioning work to be measured thereby.

13. A measuring machine comprising, in combination, a supporting member having a groove in the upper face thereof, a micrometer, means for securing said micrometer in said groove, a tail stock, and means for securing said tail stock in said groove in alinement with said micrometer and at any desired distance therefrom, said micrometer being provided at its opposite ends with spindles whereby the machine may be employed in taking either inside or outside measurements.

14. A measuring machine comprising, in combination, a supporting member having a groove in the upper face thereof, a micrometer, means for securing said micrometer in said groove, a tail stock, and means for securing said tail stock in said groove in alinement with said micrometer and at any desired distance therefrom, said micrometer having a spindle projecting in the opposite direction from said tail stock for measuring inside dimensions.

15. A measuring machine comprising, in combination, a supporting member having a groove in the upper face thereof, a micrometer, a tail stock, means for securing said micrometer and tail stock in said groove at any point along the length of the groove determined by standard lengths interposed between the same and lying in said groove, and a scale on said supporting member for checking the lengths of said standard lengths.

16. A measuring machine comprising, in combination, a supporting member having a groove in its upper face, a micrometer, a tail stock adapted to be positioned in said groove in spaced relation from said micrometer determined by standard lengths, and means for securing said tail stock in said groove, the diameter of said stock being such that its longitudinal axis is out of alignment with the longitudinal axis of said lengths when the latter are positioned in the groove.

17. A measuring machine comprising, in combination, a supporting member, a micrometer having a pair of oppositely extending spindles, one of the latter being adapted for measuring inside dimensions, means for positioning standard lengths on said supporting member in engagement with said micrometer, and means for securing said micrometer on said supporting member at any point along the length of the same.

18. A measuring machine comprising, in combination, a supporting member on which the work to be measured is adapted to be laid, a micrometer adapted to lie on said supporting member, means for securing said micrometer on said supporting member at any point along the length of the same, a tail stock adapted to lie on said supporting member, and means for securing said tail stock on said supporting member at any desired distance from the micrometer.

19. A measuring machine comprising, in combination, a supporting member on which elongated elements are adapted to be positioned, a micrometer, means for securing said micrometer on said supporting member, a tail stock, and means for securing said tail stock on said supporting member at any desired distance from said micrometer and in alinement therewith for coaction with said elements, said micrometer and tail stock being so related to said supporting member that the center lines thereof are out of alinement with the center lines of said elements when supported on said supporting member.

20. A measuring machine comprising, in combination, a supporting member on which the work to be measured is adapted to be laid, a tail stock, means for securing the same on said supporting member, a micrometer having a spindle for use in measuring inside dimensions and projecting in the opposite direction from said tail stock, and means for securing said micrometer on said support.

21. A measuring machine comprising, in combination, a supporting member having a groove in the upper face thereof, a micrometer, a tail stock, and means for securing said micrometer and tail stock in said groove at any point along the length of the groove determined by standard lengths interposed between the same in said groove and maintained in measuring position thereby.

22. A measuring machine comprising, in combination, a supporting member on which the work to be measured is adapted to be laid, a micrometer and a tail stock adapted to be positioned on said supporting member at any point along the length of the same determined by standard lengths, and means for securing said micrometer and tail stock on said supporting member, said micrometer having a measuring face at each end whereby inside and outside dimensions may be determined.

In testimony whereof I have signed this specification.

ALBERT KINGSBURY.